United States Patent [19]

Manser

[11] Patent Number: 5,582,848
[45] Date of Patent: Dec. 10, 1996

[54] PROCESS AND DEVICE FOR AUTOMATED EJECTION OF SCREWS

[75] Inventor: Josef Manser, Uzwil, Switzerland

[73] Assignee: Buehler AG, Uzwil, Switzerland

[21] Appl. No.: 307,606

[22] PCT Filed: Mar. 22, 1994

[86] PCT No.: PCT/CH94/00060

§ 371 Date: Sep. 20, 1994

§ 102(e) Date: Sep. 20, 1994

[87] PCT Pub. No.: WO94/22657

PCT Pub. Date: Oct. 13, 1994

[30] Foreign Application Priority Data

Apr. 2, 1993 [CH] Switzerland ................ 024/93

[51] Int. Cl.[6] .............. B29C 47/08; B23P 19/00
[52] U.S. Cl. .............. 425/190; 29/426.5
[58] Field of Search ............... 425/190, 192 R; 366/79, 147; 29/426.5

[56] References Cited

U.S. PATENT DOCUMENTS

| | | | |
|---|---|---|---|
| 3,734,667 | 5/1973 | Dray | 425/190 |
| 3,902,835 | 9/1975 | Theysohn | 425/192 R X |
| 4,078,454 | 3/1978 | Murakami et al. | 29/426.5 X |
| 4,619,599 | 10/1986 | Herbert et al. | 425/192 R X |

FOREIGN PATENT DOCUMENTS

| | | |
|---|---|---|
| 0271399 | 6/1988 | European Pat. Off. . |
| 1126621 | 11/1956 | France . |
| 1230553 | 12/1966 | Germany . |
| 1268367 | 5/1968 | Germany . |
| 200079 | 3/1983 | Germany . |
| 893597 | 4/1962 | United Kingdom . |
| 2174950 | 11/1986 | United Kingdom . |

Primary Examiner—Robert J. Warden
Assistant Examiner—E. Leigh Dawson
Attorney, Agent, or Firm—McAulay Fisher Nissen Goldberg & Kiel, LLP

[57] ABSTRACT

A process and a device for the automated ejection of screws from screw extruders, in particular, screw extruders for the production of dough and pasta products are described. The screw is ejected from the screw extruder in one stroke by hydraulic operation so as to provide good sliding capability.

6 Claims, 2 Drawing Sheets

PROCESS AND DEVICE FOR AUTOMATED EJECTION OF SCREWS

BACKGROUND OF THE INVENTION a) Field of the Invention

The invention is directed to a process for the automated ejection of screws using pull-out mechanisms or ejector mechanisms which are known per se set forth in the preamble of claim 1 and to a device for carrying out the process. The invention is directed in particular to the automated ejection of screws used in screw presses or screw-type extruders for producing dough and pasta products, these screw extruders being connectable with swivelable mixing kneaders.

b) Description of the Related Art

It is generally common practice to remove pressing screws and conveying or feed screws from the cylinder of a screw extruder for cleaning purposes or for replacing worn screws. Spindle-operated pull-off or ejecting devices and hydraulically actuated pull-off or pull-out devices with one or two cylinders are known for this purpose. For example, DE-AS-1268367 describes a device for ejecting the screw from the cylinder of a screw-type extruder. A pressure rod is connected with the hydraulic piston of a screw adjusting device by means of a mechanical coupling. The coupling carries the pressure rod along only in the screw ejecting direction. In addition, the pressure rod is provided with drivers whose distance from one another corresponds to the piston stroke. A plurality of strokes are required to eject the screw from the cylinder. This device is mechanically costly and occupies a large amount of space. The free cantilevering or protruding length which increases with the number of strokes is not supported, which can lead to tilting and can result in damage to the screw.

European Patent Application No. 271399 describes a process and apparatus for assembling and disassembling extruder screws. The extruder screws are transported and supported in a fixed or stationary manner. However, handling by use of load suspension means and stop means is very cumbersome.

It is also known to provide screw shafts with axial bore holes for tempering (DD-PS 200079). However, such screw shafts are not suitable when higher pressures are applied.

OBJECT AND SUMMARY OF THE INVENTION

Therefore, the primary object of the present invention is to avoid the disadvantages of known prior art and to achieve an automated and reliably functioning ejection of screws. This is effected by ejecting a screw from or pulling out a screw from a surrounding cylinder of the screw extruder in one movement hydraulically to ensure a good sliding capability. In a particularly advantageous construction, this is done 1) by applying an excess of pressure acting against an ejector rod in a chamber in an axial bore of the screw by hydraulic fluid guided via an inlet bore until the screw is ejected entirely or partially from the cylinder, 2) by using water as the hydraulic fluid, and 3) by grasping the screw at a head piece before ejecting. Further, the invention has the object of developing a device for carrying out the process which is realized by a device wherein a screw of a screw extruder is provided with an axial bore for receiving and guiding an ejector rod. The ejector rod is supported in a drive shaft of the screw extruder. The wall of the bore, an end face of the head piece and an end face of the ejector rod form a chamber in which the required ejecting pressure is built up.

Twin-screw extruders with closely meshing shafts, block extruders and the like, also those in which spline shafts, etc. are used, can also be ejected in an advantageous manner by means of the invention.

For a better understanding of the present invention, reference is made to the following description and accompanying drawings while the scope of the invention will be pointed out in the appended claims.

DESCRIPTION OF THE PREFERRED EMBODIMENTS

Figure 1:
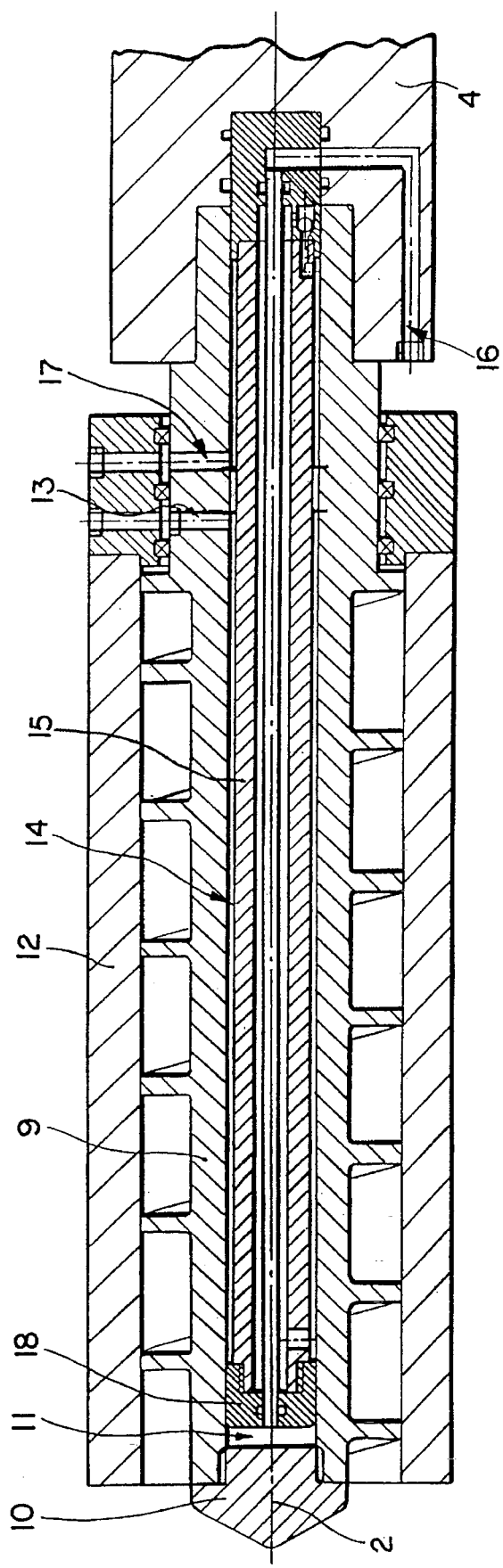
FIG. 1 shows a screw extruder with an ejector rod of a screw in a detailed cross-sectional view.
Figure 2:
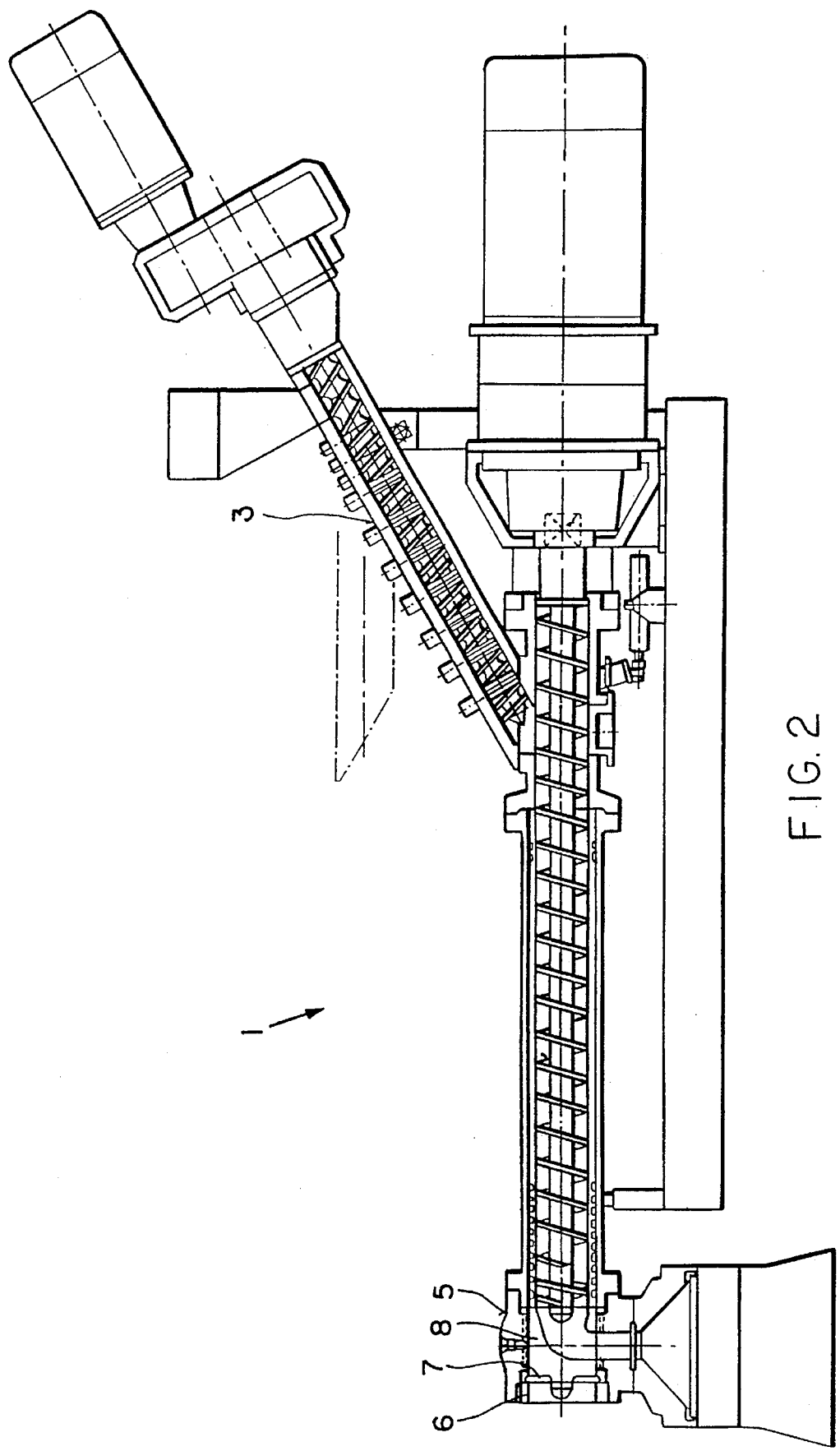
FIG. 2 shows a general plan view of the screw extruder.

The device according to the invention for automated ejection of screws substantially contains a screw extruder 1 with a screw 9. The screw 9 is provided with an axial bore 14 for receiving and guiding an ejector rod 15. The ejector rod 15 is supported in a drive shaft 4 of the screw extruder 1. The wall of the bore 14 and the end faces of a head piece 10 and ejector rod 15 form a chamber for building up the ejection pressure, wherein the hydraulic fluid is introduced via an inlet bore hole 16.

Before the screw 9 can be removed from the cylinder 12 of the screw extruder 1, a nut 6 located in the head part 5 of the screw extruder 1 is turned by 45° hydraulically in a known manner (not shown) in order to release a deflecting part 8 which is secured by a bayonet lock 7. This deflecting part 8 can be pushed out in the axial direction with the screw (9) and in turn enables access to the screw 9 so that the latter can be ejected further.

A chamber 11 in an axial bore 14 of the screw 9 is now acted upon by a pressure excess which is effected hydraulically (e.g., by water) via an inlet bore hole 16. The chamber 11 is defined by the wall of the bore 14, the head piece 10 and the end side 18 of an ejector rod 15. Since the ejector rod 15 is securely arranged and supported in the screw extruder 1, the screw 9 is ejected from the cylinder 12 in one movement by the pressure exerted against the head piece 10. The ejecting speed can be adjusted by conventional controlling means. The ejector rod 15 can be drawn in again before subjecting the screw 9 to a cleaning process by actuation through an outlet bore hole 13.

Accordingly, the screw 9 can be ejected at any time "by pushing a button".

During operation, the outlet bore holes 13 and 17 serve for the circulation of a tempering medium in the bore 14. Again, water is used for this purpose.

In this way, ejection and tempering can be combined in one device.

Further, the screw 9 can be grasped at its head piece 10 by means of a collet chuck, not shown, so as to achieve additional guidance and to support or reinforce ejection. This collet chuck can be actuated mechanically or hydraulically in a conventional manner. The screw can be handled by conventional handling techniques at different working heights of the screw extruder in floor operation and floor-mounted operation for the cleaning process.

In a further construction, the product to be processed can be introduced into the screw extruder by means of a swivelable twin-shaft mixing kneader 3. The connection between the screw extruder 1 and the mixing kneader 3 is vacuum-tight and detachable. The mixing kneader 3 and the connection zones can be cleaned easily owing to the swiveling capability of the mixing kneader 3. For this purpose, the mixing kneader 3 is swiveled into a position parallel to the screw extruder 1, which in principle also enables an operation analogous to that mentioned above.

While the foregoing description and drawings represent the preferred embodiments of the present invention, it will be obvious to those skilled in the art that various changes and modifications may be made therein without departing from the true spirit and scope of the present invention.

What is claimed is:

1. In a method for the automated ejection of screws from screw extruders by hydraulically-operated ejector rods, the improvement comprising:

providing an ejector rod having an end face and an inner bore;

providing a screw having an axial, forwardly closed inner bore in which the ejector rod is arranged, the axial bore of the screw having an axial inner wall and a forward inner wall, and wherein a chamber is formed by the axial and forward inner walls of the bore and the ejector rod end face;

introducing a hydraulic fluid into the chamber through the inner bore of the ejector rod, the hydraulic fluid creating a pressure in the chamber;

ejecting the screw by introducing hydraulic fluid to a required ejection pressure.

2. The process according to claim 1, wherein water is used as hydraulic fluid.

3. The process according to claim 1, wherein the screw is grasped at a forward end before ejecting.

4. In a device for the automated ejection of screws from a screw extruder having a screw by hydraulically-operated mechanisms, the improvement comprising:

an ejector rod having an end face;

said screw of said screw extruder having an axial bore for receiving and guiding said ejector rod, said axial bore having a wall;

said screw extruder also including a drive shaft and a head piece, said ejector rod being supported in said drive shaft; and wherein the wall of the bore, an end face of the head piece and an end face of the ejector rod form a chamber in which a required ejecting pressure is built up hydraulically.

5. The device according to claim 4, wherein the screw is tempered by hydraulic medium in an operating state via said axial bore and by outlet bore holes.

6. The device of claim 4, including an inlet bore for the supply of hydraulic fluid to said chamber.

* * * * *